United States Patent
Lipcsei

(10) Patent No.: US 6,813,173 B2
(45) Date of Patent: Nov. 2, 2004

(54) DC-TO-DC CONVERTER WITH IMPROVED TRANSIENT RESPONSE

(75) Inventor: Laszlo Lipcsei, San Jose, CA (US)

(73) Assignee: O2Micro International Limited, Grand Cayman (KY)

( * ) Notice: Subject to any disclaimer, the term of this patent is extended or adjusted under 35 U.S.C. 154(b) by 0 days.

(21) Appl. No.: 10/606,537

(22) Filed: Jun. 26, 2003

(65) Prior Publication Data

US 2004/0085789 A1 May 6, 2004

Related U.S. Application Data

(63) Continuation-in-part of application No. 10/262,537, filed on Oct. 1, 2002, now Pat. No. 6,678,178, which is a continuation of application No. 09/843,200, filed on Apr. 25, 2001, now Pat. No. 6,459,602.
(60) Provisional application No. 60/244,054, filed on Oct. 26, 2000.

(51) Int. Cl.[7] .................. H02M 7/5387; H02M 7/44; G05F 1/40
(52) U.S. Cl. .................. 363/98; 363/132; 323/288; 323/282
(58) Field of Search .................. 363/127, 97, 98, 363/132, 16, 124, 17, 72; 323/286, 288, 284, 285, 282

(56) References Cited

U.S. PATENT DOCUMENTS

| 5,111,133 | A | * | 5/1992 | Poulo et al. | 323/286 |
| 5,847,554 | A | * | 12/1998 | Wilcox et al. | 323/282 |
| 5,859,504 | A | * | 1/1999 | Nerone | 315/307 |

* cited by examiner

*Primary Examiner*—Rajnikant B Patel
(74) *Attorney, Agent, or Firm*—Grossman, Tucker, Perreault & Pfleger, PLLC

(57) ABSTRACT

A DC to DC converter having improved transient response, accuracy, and stability. The DC to DC converter includes a first comparator configured to compare a first signal with a second signal. The first signal has a DC offset determined, at least in part, by a DC reference voltage source. The second signal is representative of an output voltage level of the DC to DC converter. The comparator is further configured to provide a control signal to a driver based on a difference between the first signal and the second signal, the driver driving the output voltage of the DC to DC converter. The DC to DC converter further includes an accuracy circuit to enhance accuracy of the DC to DC converter. The DC to DC converter may further include a stability circuit to enhance stability of the DC to DC converter.

16 Claims, 13 Drawing Sheets

DC-TO-DC CONVERTER WITH IMPROVED TRANSIENT RESPONSE

CROSS-REFERENCE TO RELATED APPLICATIONS

The present application is a continuation-in-part application of U.S. patent application Ser. No. 10/262,537 filed on Oct. 1, 2002 now U.S. Pat. No. 6,678,178, which itself is a continuation application of U.S. patent application Ser. No. 09/843,200 filed Apr. 25, 2001, now U.S. Pat. No. 6,459,602, which all claim the benefit of U.S. Provisional Application Serial No. 60/244,054 filed Oct. 26, 2000, all the teachings of which are incorporated herein by reference.

TECHNICAL FIELD

The invention generally relates to voltage converters, and more particularly to a direct-current (DC) to direct-current (DC) converter that exhibits improved transient response, accuracy, and stability.

BACKGROUND OF THE INVENTION

Direct-current (DC) to direct-current (DC) converters are well-known in the field of electronics. Such circuitry or devices are typically employed to convert from one DC voltage level to another DC voltage level. They are used in a variety of environments. For instance, several kinds of such converters are used to supply microprocessor core voltage. One kind of such converters is referred to as a fixed frequency converter, also known as pulse-width modulated (PWM) converter. A PWM converter includes voltage mode converters and current mode converters.

A voltage mode PWM converter includes a control loop that contains an error amplifier, a PWM comparator, and one or more drivers, usually coupled with a synchronous rectifier to improve performance. The output voltage is compared with a reference voltage by the error amplifier. The PWM comparator receives the output of the error amplifier as its first input and receives a saw-tooth or a triangle signal as its second input. The PWM comparator's output is a PWM signal that is amplified by the drivers driving the power switches. The advantages of this kind of converters are simplicity in architecture and high precision. Its major disadvantage is its slow response to load transients because of the compensation needed on the error amplifier.

A current mode PWM converter includes two control loops—an inner current loop and an outer voltage loop which controls the inner current loop. The inner current loop consists of a current amplifier, a comparator that uses as inputs an error voltage from the outer voltage loop and the output of the current amplifier, a flip-flop that is set every time by the clock signal and reset by the output of the comparator, and one or more drivers. The outer voltage loop includes a voltage error amplifier that compares the output voltage with a reference voltage. The output of the error amplifier is a reference for the inner current loop. The advantages of this kind of converters include high stability, high precision, and suitability for multiphase architecture. Its major disadvantage is its slow response to load transients due to the compensation of the outer voltage loop.

Another kind of DC to DC converter is referred to as a constant on time converter, also known as pulse-frequency modulated (PFM) converter. A PFM converter consists of a control loop which contains an error amplifier, a comparator, and one or more drivers, usually coupled with a synchronous rectifier to improve performance. The output voltage is compared with a reference voltage by the error amplifier. The output of the error amplifier is compared with a reference to obtain a triggering signal for a one-shot that sets the constant on time. The advantages of this kind of converters include simplicity in architecture, high precision, and a comparative fast response to load transients. Its major disadvantages are non-fixed frequency and non-suitability for multiphase applications.

Another kind of DC to DC converter is referred to as a hysteretic converter, including voltage mode hysteretic converter and current mode hysteretic converter. A voltage mode hysteretic converter includes a control loop, which contains a hysteretic comparator, and one or more drivers, usually coupled with a synchronous rectifier to improve performance. The output voltage is compared with a reference voltage by the comparator that has a hysteretic. The output of the comparator is used as input for the drivers. The advantages of this kind of converters include simplicity in architecture, high precision, and fast transient response to load steps. Its disadvantages are non-fixed frequency and non-suitability for multiphase architecture.

A current mode hysteretic converter includes a control loop that contains a voltage error amplifier, a hysteretic current comparator, and one or more drivers, usually coupled with a synchronous rectifier to improve performance. The output voltage is compared with a reference voltage by the voltage error amplifier that generates an offset signal for the current comparator. The output of the comparator is used as input for the drivers. The advantages of this kind of converters include simplicity in architecture and high precision. Its disadvantages include slow transient response to load steps, non-fixed frequency, and non-suitability for multiphase architecture.

What is desired is a simpler and relatively cost effective solution for DC-to-DC conversion with fast response to load transients, high precision, fixed frequency, and suitability for multiphase applications.

SUMMARY OF THE INVENTION

A DC to DC converter consistent with the invention includes: a first comparator configured to compare a first signal with a second signal. The first signal has a DC offset determined, at least in part, by a DC reference voltage source. The second signal is representative of an output voltage level of the DC to DC converter. The comparator is further configured to provide a control signal to a driver based on a difference between the first signal and the second signal, the driver driving the output voltage of the DC to DC converter. The DC to DC converter further includes an accuracy circuit configured to provide a predetermined offset voltage value to one of the first signal and the second signal based on a difference between a DC voltage level of the DC reference voltage source and the output voltage of the DC to DC converter.

In another embodiment, a DC to DC converter consistent with the invention includes a first comparator configured to compare a first signal with a second signal. The first signal has a DC offset determined, at least in part, by a DC reference voltage source. The second signal is representative of an output voltage level of the DC to DC converter. The comparator is further configured to provide a control signal to a driver based on a difference between the first signal and the second signal, the driver driving at least one switch to control a level of the output voltage of the DC to DC converter. The DC to DC converter further includes an inductor coupled to the at least one switch; and a stability circuit configured to provide the second signal to the comparator based on a current level through the inductor.

DETAILED DESCRIPTION OF THE INVENTION

Figure 1:
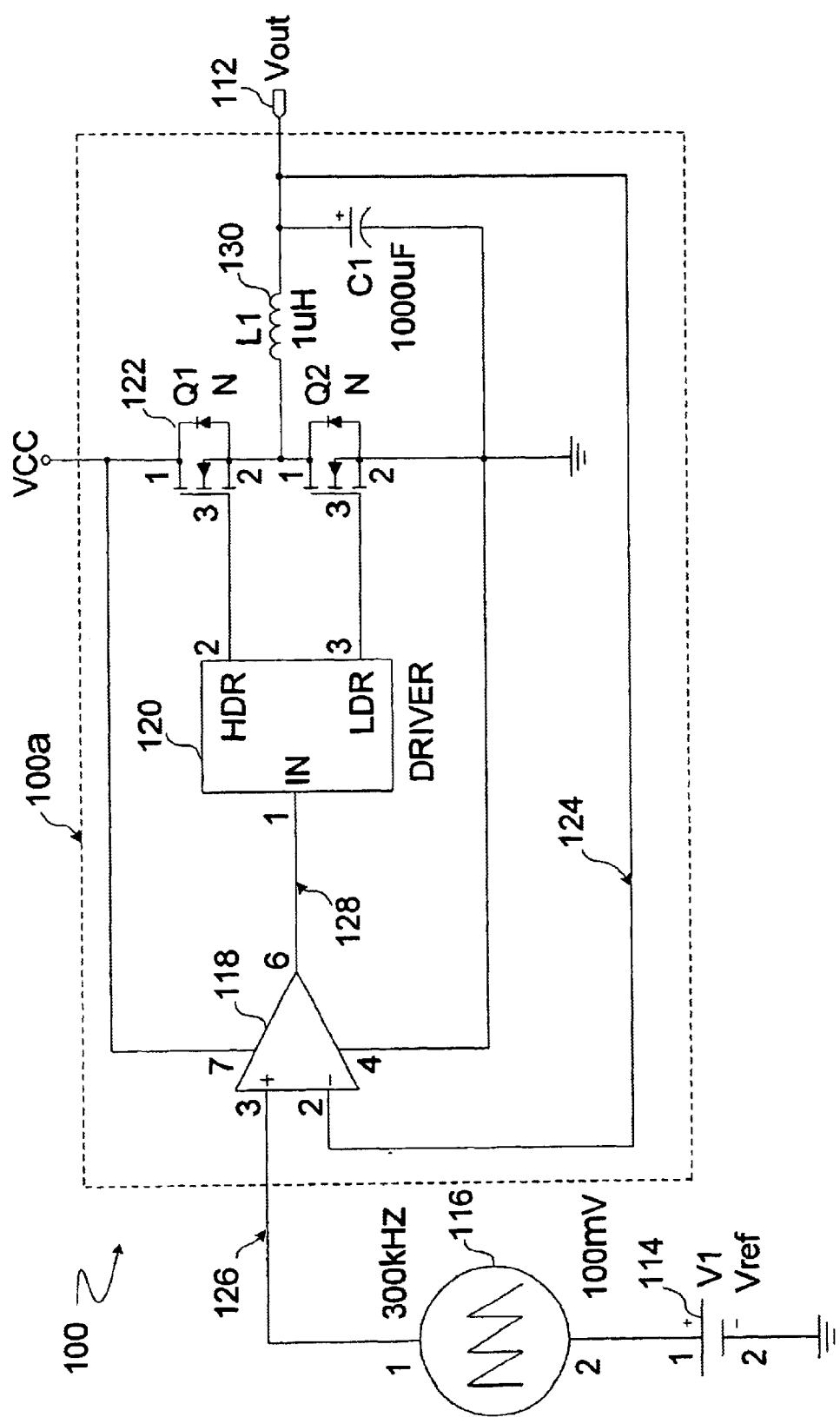
FIG. 1 is a circuit diagram that illustrates an embodiment of a fast transient response DC-DC converter according to the invention.

FIG. 1 is a circuit diagram that illustrates a fast transient response DC-DC converter 100 according to the invention. Generally, the DC-to-DC converter 100 stabilizes output voltage $V_{out}$ 112 according to the reference signal at the input of the comparator. During a transient, the output load is in the process of switching from one DC state to another. The DC-to-DC converter 100 effectively reduces recovery time from a transient by modifying duty cycle in order to drive the $V_{out}$ 112 to the desired steady state.

The DC-to-DC converter 100 uses a reference DC voltage source $V_{ref}$ 114, a reference signal generator 116, a comparator 118, a driver 120, and a pair of switches 122. The signal generator 116 generates a reference signal 126, which is preferably a 300 kHz saw-tooth signal, or alternatively, any shape of periodic signal such as a triangular signal or a sinus signal, with a DC offset determined by the DC voltage generated by $V_{ref}$ 114. The reference signal 126 is received by the comparator 118 as its first input. Through a feedback loop 124, the output voltage $V_{out}$ 112 is received by the comparator 118 as its second input. The comparator 118 compares the $V_{out}$ 112 with the reference signal 126, and generates a PWM signal 128 with a duty cycle determining an increase or decrease in $V_{out}$ 112. Further, the comparator 118 forces $V_{out}$ 112 to follow the reference signal 126 by increasing or decreasing the pulse width of its output PWM signal 128 if $V_{out}$ 112 is lower or higher than signal 126 respectively. Specifically, the driver 120 receives the PWM signal 128 as its input and drives the switches 122, which are preferably implemented as Metal Oxide Semiconductor Field Effect Transistors (MOSFETs), high and low alternatively to control the $V_{out}$ 112. Preferably, as a result, $V_{out}$ 112 approximates $V_{ref}$ and is maintained within the limits of the reference signal 126. For example, where the reference signal generator 116 generates a saw-tooth reference signal 126 with peak to peak sawtooth fluctuations of 100 mV at a particular DC $V_{ref}$ voltage, $V_{ref}-50$ mV $< V_{out} < V_{ref}+50$ mV. Additionally, a LC low pass filter is coupled in series with the output load ($V_{out}$) 112. The inductance of the inductor 130 in the low pass filter should be kept as small as possible in order to reduce the recovery time for a transient of the load.

Figure 2:
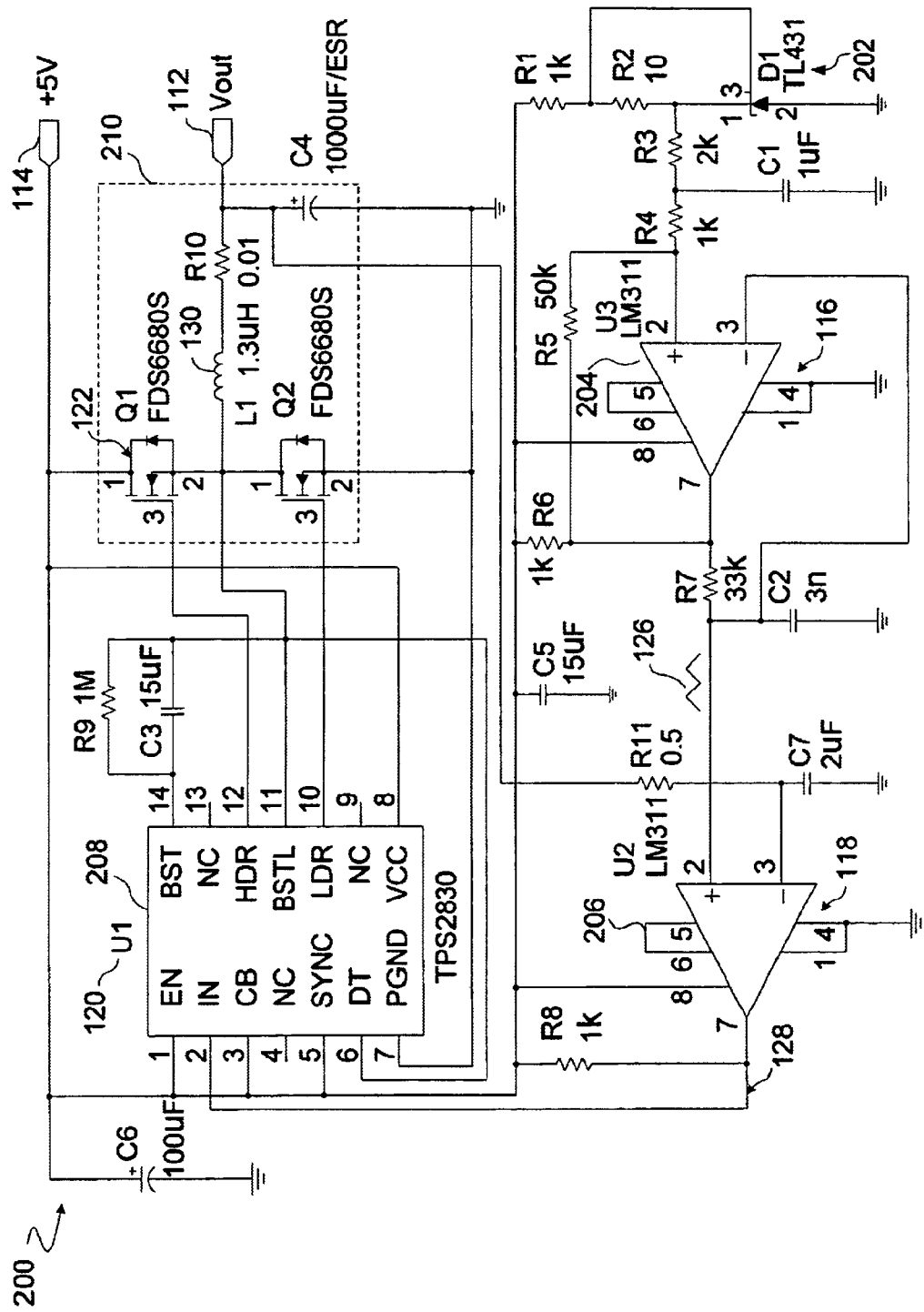
FIG. 2 is a circuit diagram that illustrates an exemplary application of the DC-to-DC converter of FIG. 1.

FIG. 2 provides an exemplary application circuit 200 illustrating an application of the DC to DC converter circuit 100 of FIG. 1. The circuit 200 uses a reference voltage generator built with, for example, D1 (TL431) 202, compensating for the varying of input voltage 114 to ensure the generation by comparator 118 of a PWM signal 128 which regulates the output voltage $V_{out}$ in accordance with the reference voltage as described above. A ramp generator 116, generating a triangular signal 126 with peak to peak amplitude of approximately 100 mV, is built with part U3 (LM311) 204. The comparator 118 described above, which receives as inputs the output voltage $V_{out}$ 112 and the triangular signal 126 and generates a PWM signal 128, is built with U2 (LM311) 206. The driver 120 in the exemplary application is built with U1 (TPS2830) 208. Finally, a power block 210 consisting of MOSFETs Q1 and Q2, 122, inductor L1, 130, resistor R10, and capacitor C4, drives the output voltage $V_{out}$ 112. This DC to DC converter circuit provides for improved recovery time of a transient of the load. Note that this invention includes but is not limited by the components and circuit of the application schematic of FIG. 2.

Alternative embodiments of the invention may include two or more converter circuits 100 in a multiphase architecture, wherein the angle of the phase shifting between two circuits depends on the number of phases used. For example, in a four-phase architecture, the shifting angle is 90 degrees. A concern with the multiphase architecture is the undesired current flow between two phases. For instance, when a load is applied on the output, if one phase delivers much more current than the other to the load, the conversion efficiency will be severely affected. The problem is similar with putting in parallel two voltages sources. If the two voltage sources are different, a current will flow between them. To solve this problem in a multiphase DC-to-DC converter, a current balancing mechanism is necessary. For example, in a two phase DC-to-DC converter, a current balancing block is used to adjust the output voltage of the second phase to be identical with the output voltage of the first phase. By using current sense resistors, the current information is available to the current balancing block that will generate an offset voltage used to adjust the output voltage of the second phase. There are two options to execute the current balancing mechanism: (1) by modifying the reference voltage for the second phase; or (2) by modifying the feedback voltage for the second phase.

Figure 3:
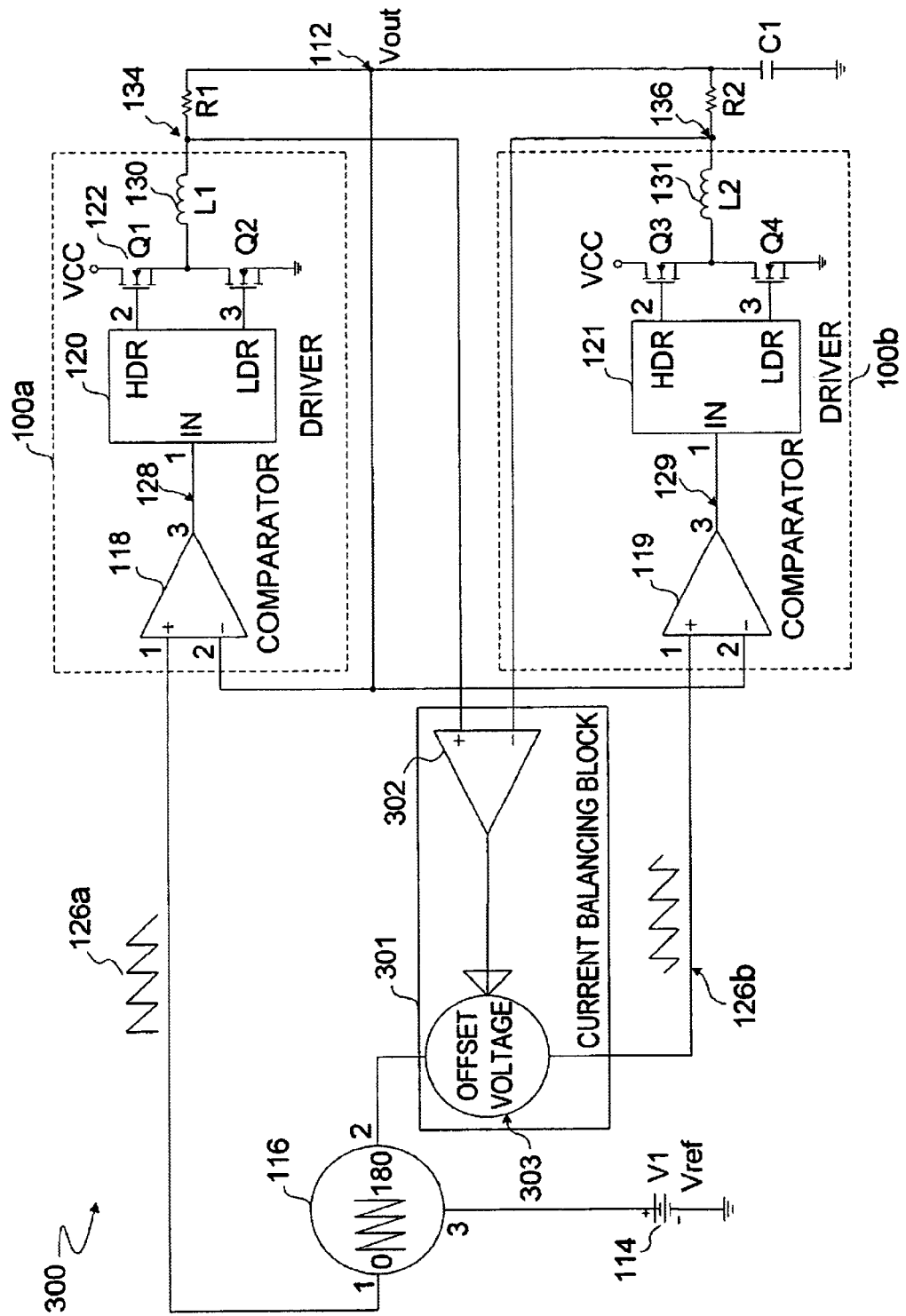
FIG. 3 is a circuit diagram that illustrates an embodiment of a two-phase DC-to-DC converter which is coupled with a current balancing block that acts on reference signal side of the second phase.

Referring to FIG. 3, illustrated is an embodiment of a two-phase DC-to-DC converter 300 with a current balancing block that acts on reference signal of the second phase. The first phase 100a establishes the output voltage 112 depending on the reference signal 126a applied on the input of the comparator 118. The current balancing block 301 shifts the DC value of the reference signal 116 for the second phase 100b to obtain the same current magnitude delivered by each phase. Assuming the current through the first phase 100a is of a higher value than the current through the second phase 100b, the voltage on the non-inverting input of the error amplifier 302 is higher than the voltage on the inverting input. The error amplifier 302 acts to reduce the value of the offset voltage 303 and thus the DC values of the reference voltage for the second phase 100b increases. Accordingly, the duty cycle of the second phase increases. Consequently, the second phase delivers a current with higher value than before. When the currents delivered by each phase are equal, the offset voltage 303 is maintained at that value to keep a current balance.

Figure 4:
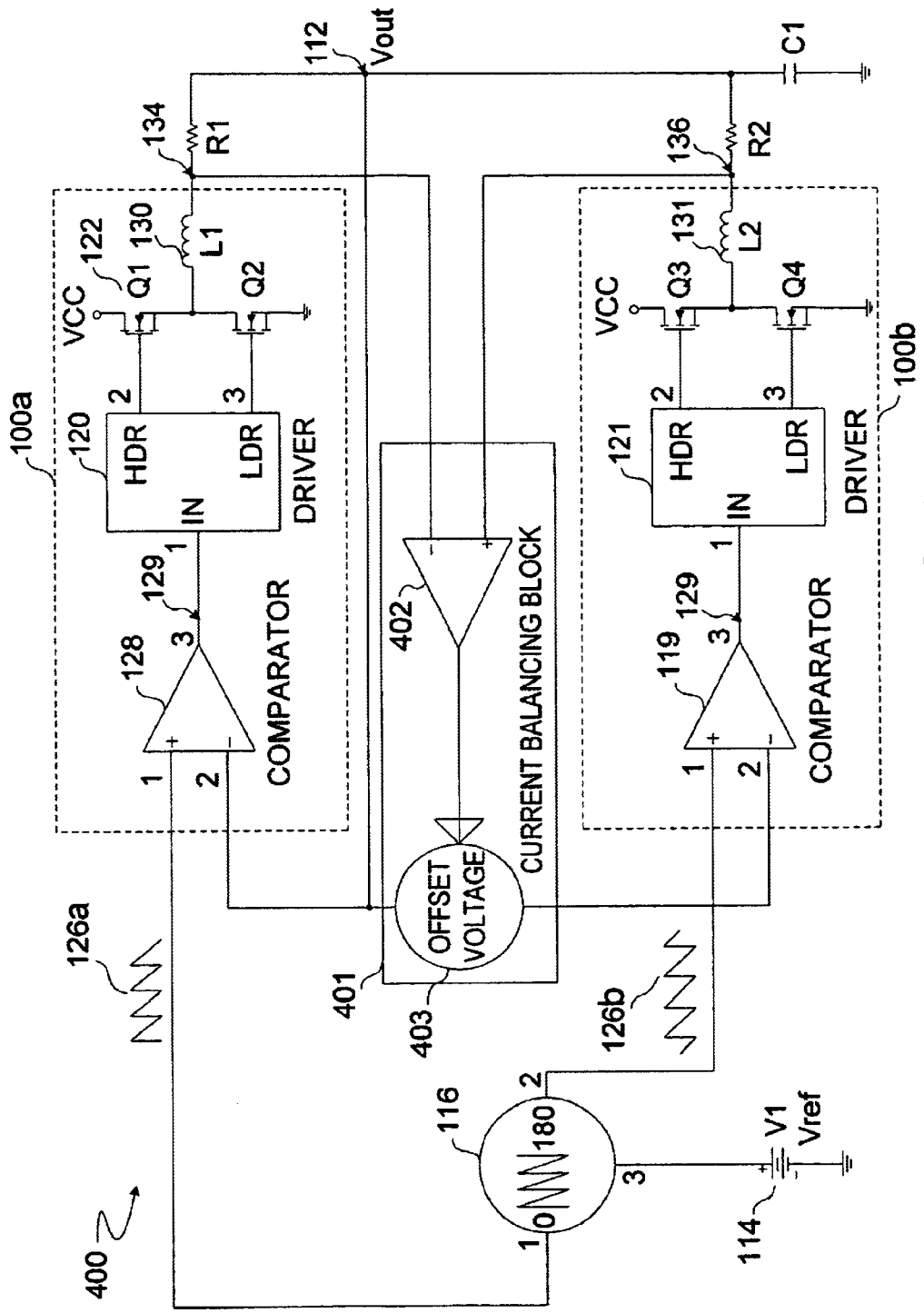
FIG. 4 is a circuit diagram that illustrates another embodiment of a two-phase DC-to-DC converter which is coupled with a current balancing block that acts on feedback side of the second phase.

Referring to FIG. 4, illustrated is another embodiment of a two-phase DC-to-DC converter 400 with a current balancing block that acts on feedback side of the second phase. The first phase 100a establishes the output voltage $V_{out}$ 112 depending on the reference signal 126a applied on the input of the comparator 128. The current balancing block 401 shifts the DC value of the feedback voltage for the second phase 100b to obtain the same current magnitude delivered by each phase. Assuming the current through the first phase 100a is of a value higher than the current through the second phase 100b, the voltage on the inverting input of the error amplifier 402 is higher than the voltage on the non-inverting input. The error amplifier 402 acts to increase the value of the offset voltage 403 and thus the DC value of the feedback voltage for the second phase 100b decreases. Accordingly, the duty cycle of the second phase 100b increases. Consequently, the second phase 100b delivers a current with a higher value than before. When the currents delivered by each phase are equal, the offset voltage 403 is maintained at that value to keep a current balance. Note that the inverting and non-inverting inputs of the current balancing block in FIG. 4 is reversed than in FIG. 3 because the current balancing block in FIG. 4 is acting on the feedback voltage.

The main advantage of the current balancing mechanism used in the converters illustrated in FIG. 3 and FIG. 4 is that when alteration of the load generates a transient, both phases act to recover the output voltage to its steady state. Because the behavior of each phase in transient is almost the same (only minor differences exist due to the spreading of the values of components used), the current balancing circuit only needs to correct slight differences modifying a little bit of the offset voltage on reference side as in FIG. 3 or feedback side as in FIG. 4 to balance the currents for the new steady state.

Note that both types of current balancing methods could be used in a multiphase architecture where the current balancing block has as inputs the current information from each N phase and the output voltage and generates the offset voltages for phase 2 to N to balance the currents with the current on the first phase.

Figure 5A:
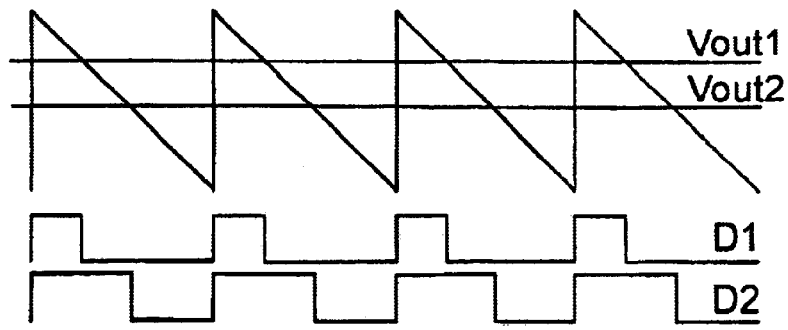
FIG. 5A is a graphical diagram showing the variation of the output voltage with the input voltage of the DC-to-DC converter.

Referring to FIG. 5A, illustrated is a diagram showing the variation of the output voltage with the input voltage. For a certain input voltage $V_{in}$, because the reference signal is constant, the duty cycle will be $D_1 = V_{out}1/V_{in}$. This means that the voltage $V_{out}1$ crosses the reference signal at such a value that the duty cycle is obtained. If the input voltage decrease, for example, to $k*V_{in}$ where k<1, the output voltage decreases in order to increase duty cycle, because the new value of the duty cycle is $D_2 = V_{out}2/k*V_{in}$. Therefore, the output voltage decreases with a value of $(D_2-D_1)*$(Amplitude of saw tooth reference signal). Even for very low amplitudes of the reference signal, because the input voltage may vary between large limits, the output voltage varies with the input voltage.

Figure 5B:
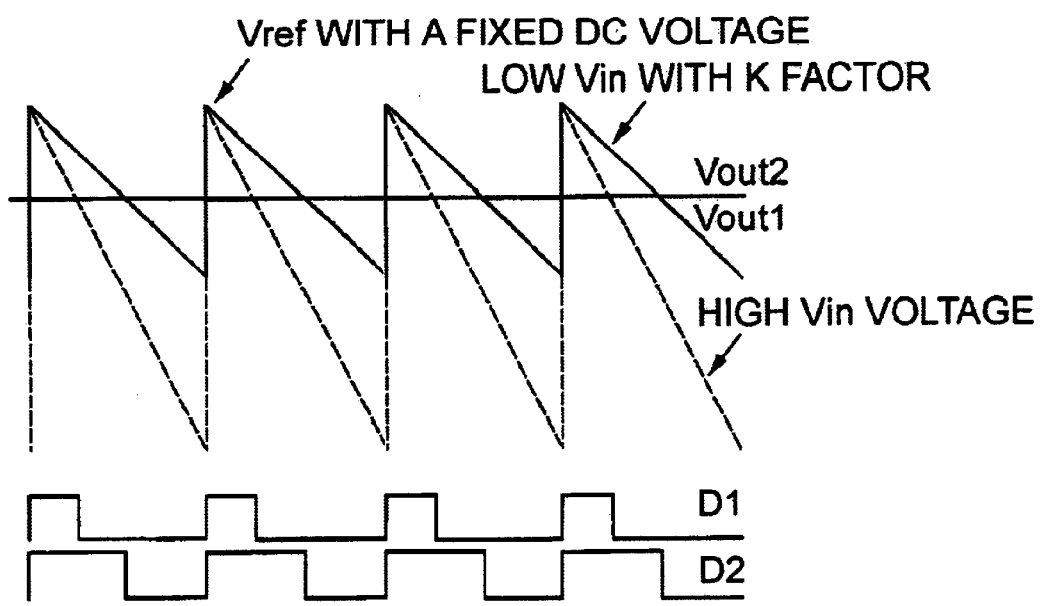
FIG. 5B is a graphical diagram illustrating a method to compensate the output voltage with the input voltage.

Referring to FIG. 5B, illustrated is a method to compensate the output voltage with a varying input voltage. One way to prevent the output voltage from varying with the input voltage is to generate a saw tooth signal with an amplitude proportional with the input voltage and its top to be maintained at a fixed DC voltage level $V_{ref}$. This means that for the input voltage equal with $V_{in}$, the output voltage is $V_{out}1$ corresponding to a value where the output voltage and the saw tooth signal cross each other to obtain duty cycle $D_1 = V_{out}1/V_{in}$. Therefore, if the amplitude of the saw tooth signal is $A_{sawtooth}$ and the top of it has a value $V_{ref}$, then $V_{out}1 = V_{ref} - D1*A_{sawtooth}$, i.e., $V_{out}1 = V_{ref} - V_{out}1*A_{sawtooth}/V_{in}$, or $V_{out}1 = V_{ref}/(1+A_{sawtooth}/V_{in})$.

When the input voltage is decreasing with a k<1 factor, the amplitude of the saw tooth decreases with the same k factor maintaining the top of the saw tooth signal at $V_{ref}$. The duty cycle corresponding to the new value of input voltage is: $D_2 = V_{out}2/(k*V_{in})$. However, because $V_{out}2 = V_{ref} - D_2*(k*A_{sawtooth}) = V_{ref} - V_{out}2*k*A_{sawtooth}/(k*V_{in})$, $V_{out}2 = V_{ref}/(1+A_{sawtooth}/V_{in})$. This means that the $V_{out}1 = V_{out}2$. Therefore, the output voltage does not vary with the input voltage.

The major advantages of the method described above include: (1) the output voltage does not depend on the input voltage; (2) the gain of the loop does not depend on the input voltage and thus the behavior of the DC-to-DC converter maintains the same for various input voltages. The gain of the loop is actually $V_{in}/A_{sawtooth}$. Because $A_{sawtooth}$ is proportional to $V_{in}$, the gain is constant; and (3) at a higher input voltage, there is a higher noise on the output due to the switching. When the saw tooth signal amplitude is increased, the PWM comparator works correctly, without generating parasitic pulses due to the noise in the output voltage.

Figure 6:
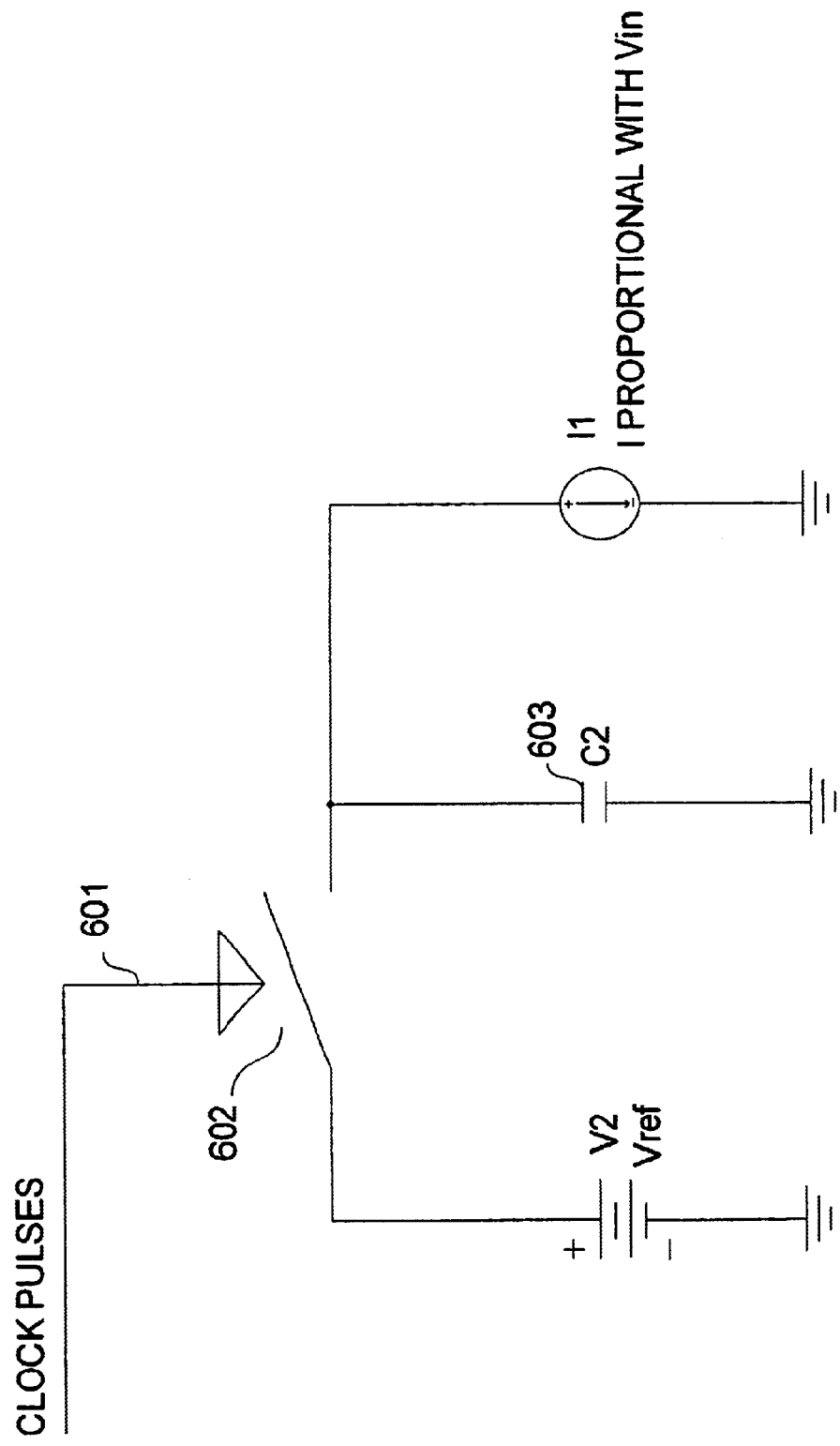
FIG. 6 is a circuit diagram illustrating the mechanism to compensate the output voltage to the varying of the input voltage.

FIG. 6 is a circuit diagram illustrating the method to compensate the output voltage to the varying of the input voltage. The clock pulses 601 close the switch 602 for a very short time which is long enough to charge capacitor 603 to $V_{ref}$ value. In this way, the top of the saw tooth signal is exactly $V_{ref}$. The switch 602 opens and the capacitor 603 is discharged with a constant current proportional to the input voltage. The elements of the circuit will be adjusted to obtain the desired amplitude of the saw tooth. This circuit compensates the output voltage to the varying of the input voltage. One application of this circuit is the case in a notebook computer where the input voltage could be the battery voltage or the adapter voltage. Adapter voltage is usually 20V where a discharged battery voltage could be as low as 8V or less. The system is required to work over the entire range.

Figure 7:
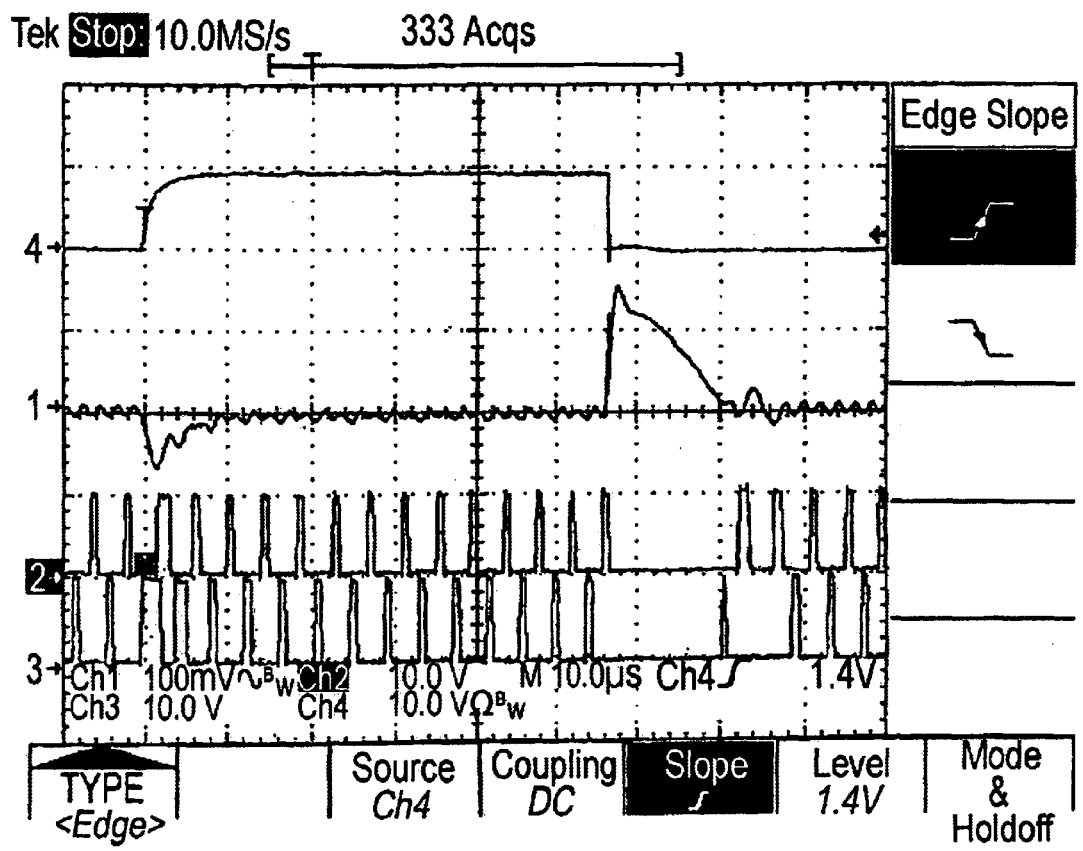
FIG. 7 is a screen capture that shows the waveforms for the output voltage, the load current, and the PWM signals when a load is applied to and removed from a two phase DC-to-DC converter.

FIG. 7 is a screen capture showing the waveforms of a transient when a load is applied to and removed from a two phase DC-to-DC converter. The load current step is 20 Amperes. CH1 is the waveform of the output voltage ($V_{out}$). CH2 is the waveform of the PWM signal of the first phase (PWM1). CH3 is the waveform of the PWM signal of the second phase (PWM2). CH4 is the waveform of ½ load current. When the load is applied (i.e. the current increases from 0 Amperes to 20 Amperes), the $V_{out}$ drops. Because the converter has an increased duty cycle, the output voltage returns to its steady state after a very short time (the transient response of the converter is about 100 ns that allows recovery times below 10 $\mu$s). When the load is removed, the converter acts to reduce duty cycle to recover $V_{out}$. As shown in FIG. 7, each phase modifies its own PWM in order to recover $V_{out}$ from the transient condition. Therefore, when a multiphase architecture is used, the transient on $V_{out}$ will be recovered much faster depending on the number of phases.

Figure 8:
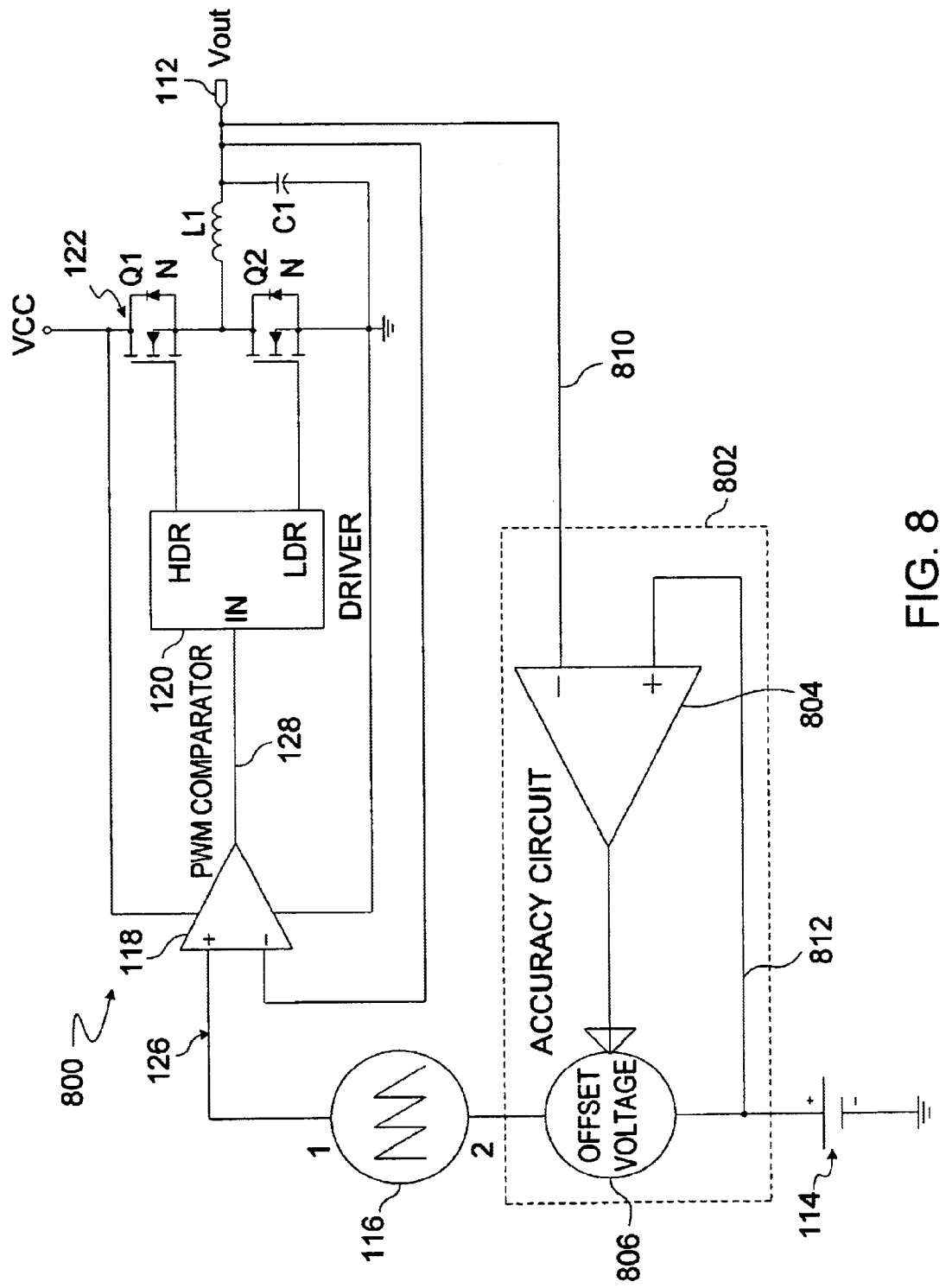
FIG. 8 is an exemplary DC to DC converter having an accuracy circuit acting on the reference voltage to improve accuracy of the DC to DC converter output voltage.

Turning to FIG. 8, another embodiment of a DC-DC converter 800 consistent with the invention is illustrated where the DC voltage level of the signal 126 may be modified in a way to increase the output voltage accuracy of the DC-DC converter 800. In general, a DC loop including an accuracy circuit 802 may modify the voltage level of the reference signal 126 provided by the reference DC voltage source 114. The voltage level of the reference signal may be modified by the offset voltage source 806 depending on the difference between the output voltage level $V_{out}$ at terminal 112 and the voltage level provided by the reference DC voltage source 114. In addition to the offset voltage source, the accuracy circuit 802 may include an error amplifier 804.

A signal representative of the output voltage level of the DC-DC converter may be fed back via path 810 to one input, e.g., the inverting input, of the error amplifier 804. Another signal representative of the reference DC voltage source 114 may be provided via path 812 to another input, e.g., the noninverting input, of the error amplifier 804. The error amplifier 804 compares these two signals and outputs a control signal to the offset voltage source 806 depending on the difference.

If the converter output voltage level at terminal 112 is lower than the voltage level provided by the reference DC voltage source 114, then the error amplifier 804 may output a control signal that will instruct the offset voltage generator 806 to generate a positive offset voltage level that will be added to the voltage level provided by the reference DC voltage source 114. The DC level of the ramp reference signal 126 will be increased accordingly. Because the ramp reference signal 126 has a higher DC value, the comparator 118 will increase the duty cycle of its output PWM signal 128. As such, the output voltage of the converter at terminal 112 will be increased until it reaches the reference DC voltage value provided by the reference DC voltage source 114.

If the converter output voltage level at terminal 112 is higher than the voltage level provided by the reference DC voltage source 114, then the error amplifier 804 will output a control signal that will instruct the offset voltage generator 806 to generate a negative offset voltage level that will be added to the voltage level provided by the reference DC voltage source 114. The DC level of the ramp reference signal 126 will be decreased accordingly. Because the ramp reference signal 126 has a lower DC value, the comparator 118 will decrease the duty cycle of its output PWM signal 128. As such, the output voltage of the converter at terminal 112 will be decreased until it reaches the reference DC voltage value provided by the reference DC voltage source 114. This DC accuracy loop that modifies the reference signal DC level provided by the DC voltage source 114 as modified by the offset voltage source 806 may be a slow loop such that voltage changes from the offset voltage source 806 may be done slowly, e.g., the compensation for this loop can be done in such a way to have lower than unitary gain for frequencies with at least one decade below the LC double pole.

Figure 9:
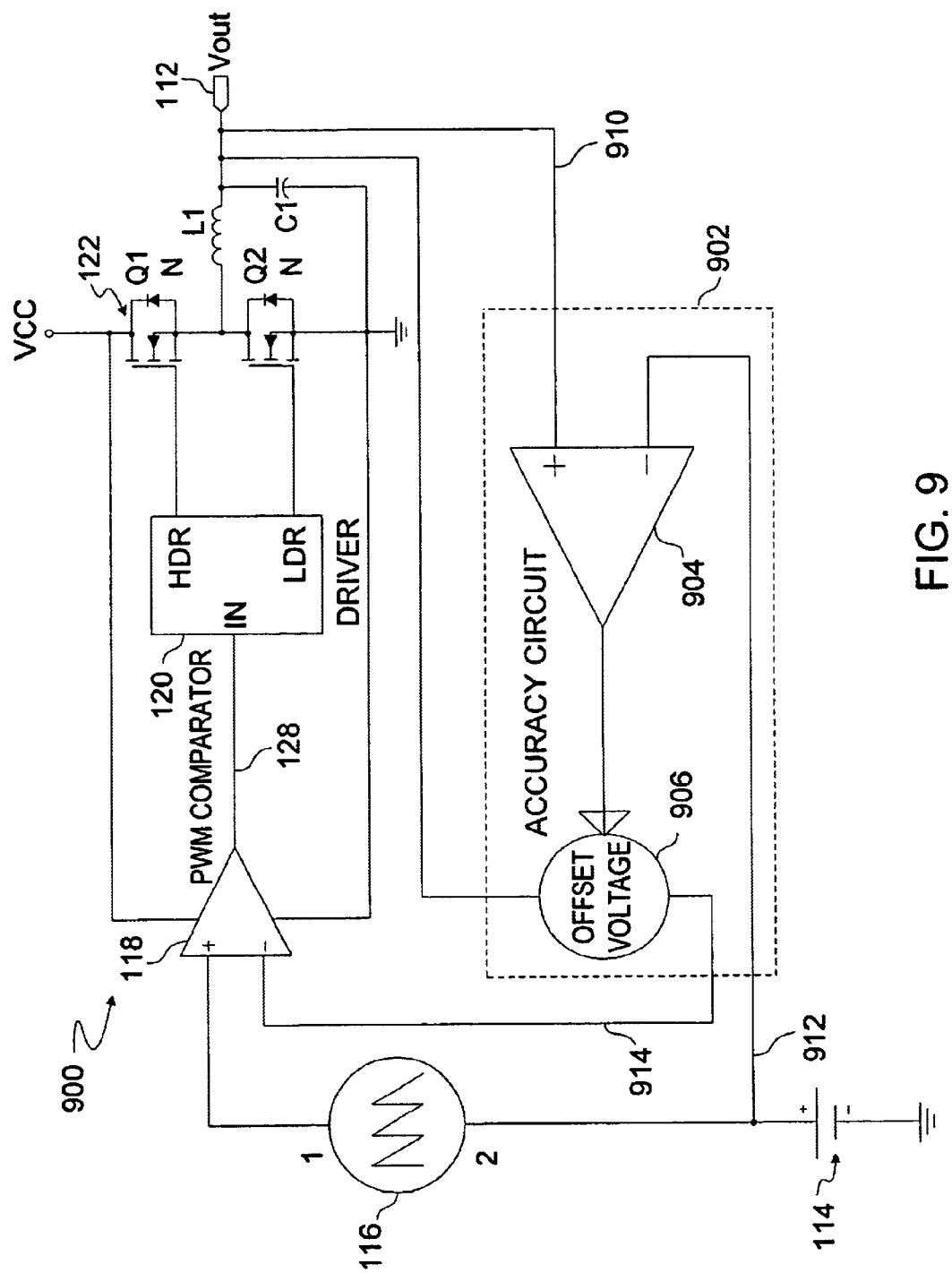
FIG. 9 is an exemplary DC to DC converter having an accuracy circuit acting on a feedback signal to improve accuracy of the DC to DC converter output voltage.

Turning to FIG. 9, another embodiment of a DC-DC converter 900 consistent with the invention is illustrated where the feedback value from the $V_{out}$ terminal 112 to the comparator 118 may be modified in a way to increase the accuracy of the DC-DC converter 900. In general, a DC loop including an accuracy circuit 902 may modify a feedback signal representative of the output voltage of the converter depending on the difference between the converter output voltage level $V_{out}$ and the voltage level provided by the reference DC voltage source 114. The accuracy circuit 902 may include an error amplifier 904 and an offset voltage source 906.

A signal representative of the output voltage level of the DC-DC converter may be fed back via path 910 to one input, e.g., the non-inverting input, of an error amplifier 904. Another signal representative of the DC output voltage level of the reference DC voltage source 114 may be provided via path 912 to another input, e.g., the inverting input, of the error amplifier 904. The error amplifier 904 compares these two signals and outputs a control signal to the offset voltage source 906 depending on the difference. Note the inverting and noninverting inputs of error amplifier 904 may be reversed with respect to the error amplifier 804 of FIG. 8 since the accuracy circuit of FIG. 9 is acting on the feedback voltage.

If the converter output voltage level at terminal 112 is lower than the voltage level provided by the reference DC voltage source 114, then the error amplifier 904 will output a control signal that will instruct the offset voltage generator 906 to generate a negative offset voltage level that will be added to the feedback signal to reduce it accordingly. Because the signal fed via path 914 to the comparator 118 is lower than it otherwise would be without the negative offset in this situation, the duty cycle of the PWM signal 128 output from the comparator 118 increases. The increased duty cycle, in turn, increases the output voltage of the converter 900 at the output terminal 112 until it reaches the reference value provided by the reference DC voltage source 114.

In contrast, if the converter output voltage level at terminal 112 is higher than the voltage level provided by the reference DC voltage source 114, then the comparator 904 will output a control signal that will instruct the offset voltage generator 906 to generate a positive offset voltage level that will be added to the feedback signal to increase it accordingly. Because the signal fed via path 914 to the comparator 118 is higher than it otherwise would be without the positive offset in this situation, the PWM signal 128 output from the comparator 118 has a decreased duty cycle. The decreased duty cycle, in turn, decreases the output voltage of the converter 900 at the output terminal 112 until it reaches the reference value provided by the reference DC voltage source 114. This DC accuracy loop that modifies the feedback voltage level to the comparator 118 may be a slow loop such that voltage changes from the offset voltage source 906 may be done slowly.

Figure 10:
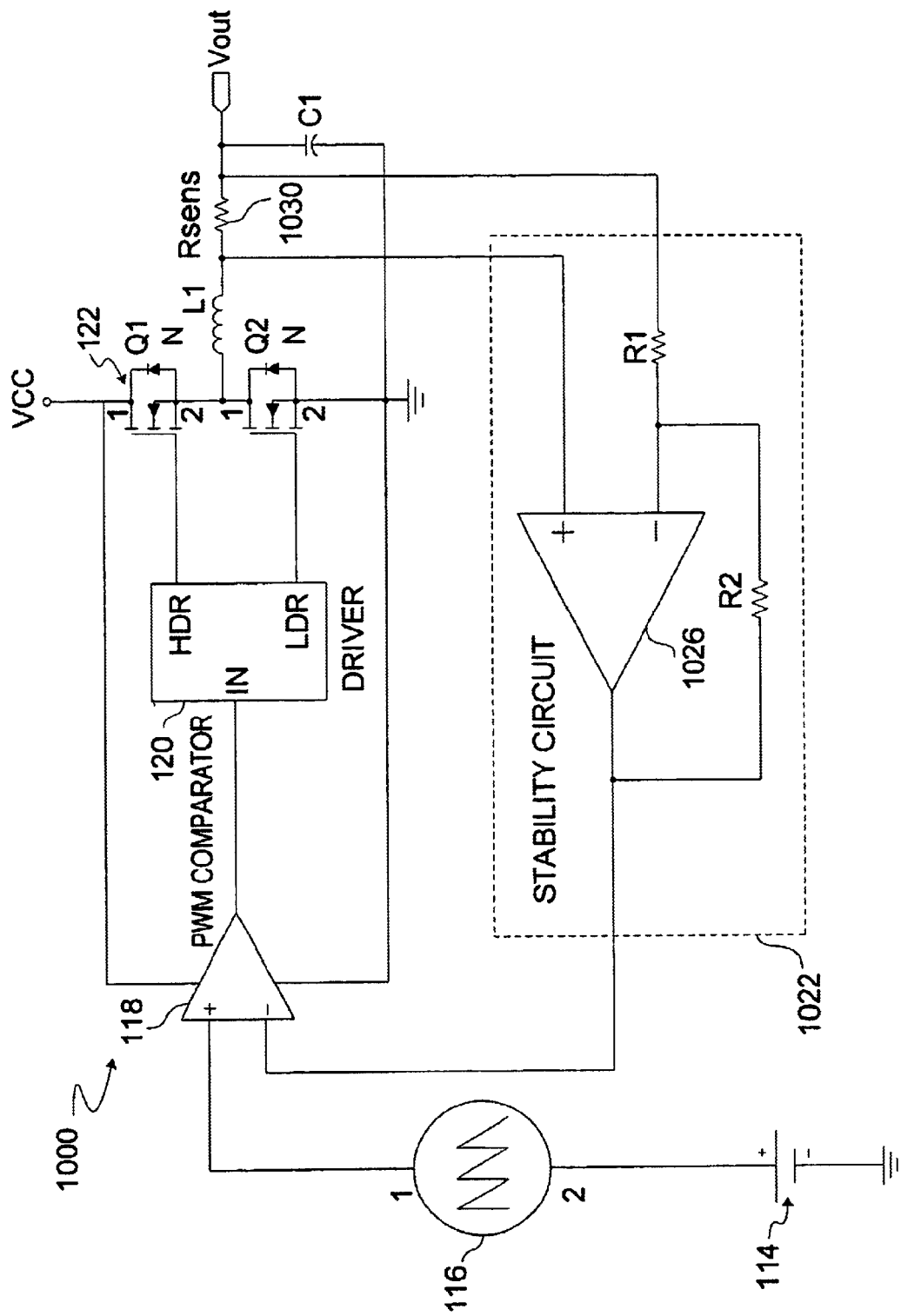
FIG. 10 is an exemplary DC to DC converter having a stability circuit utilizing inductor current information to improve stability of the DC to DC converter.
Figure 11:
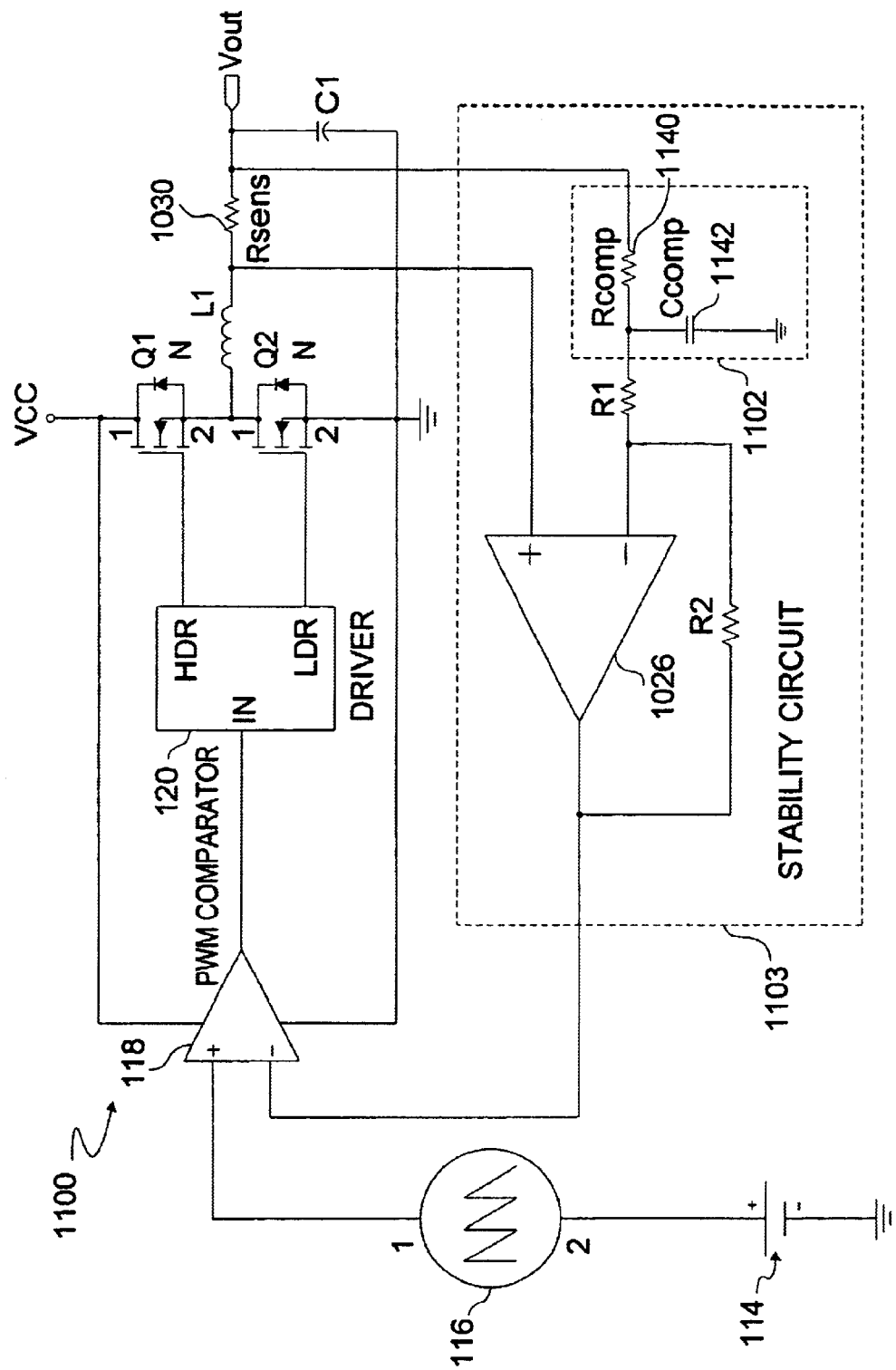
FIG. 11 is the exemplary DC to DC converter of FIG. 10 where the stability circuit includes an RC circuit.
Figure 12:
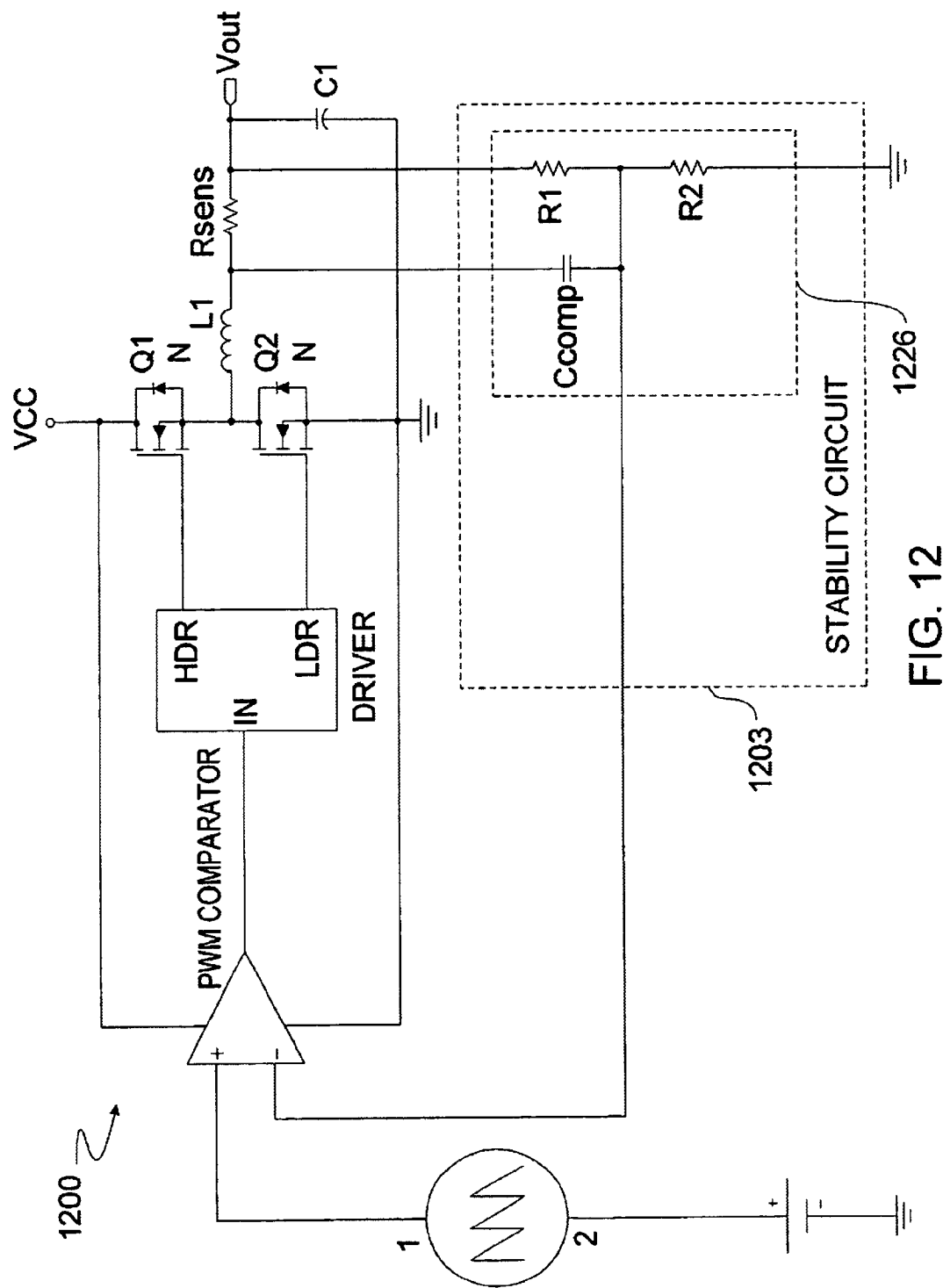
FIG. 12 is an exemplary DC to DC converter having a stability circuit utilizing AC inductor current information to improve stability of the DC to DC converter.
Figure 13:
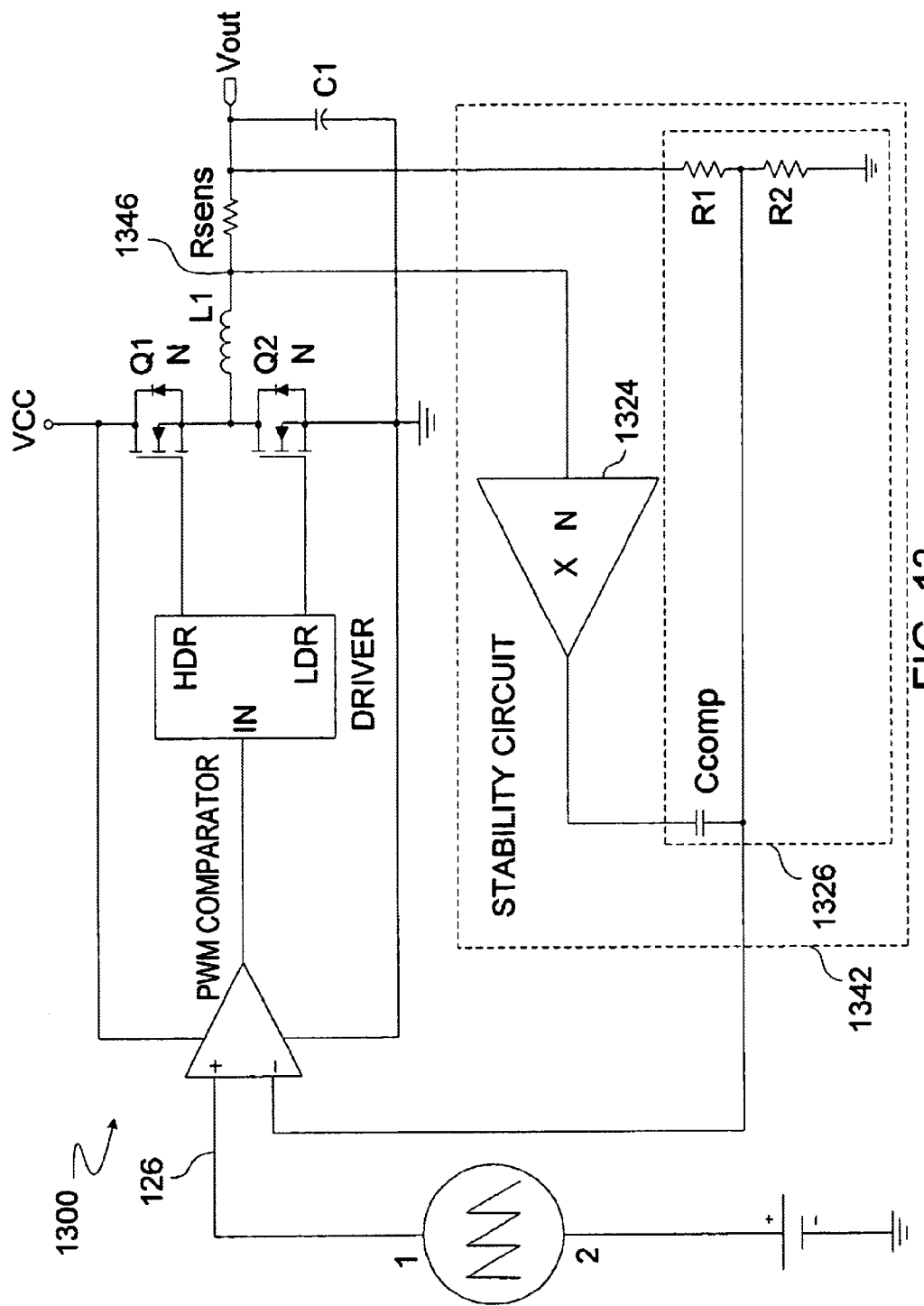
FIG. 13 is the exemplary DC to DC converter of FIG. 12 where the stability circuit includes an amplifier.

Stability of a DC to DC converter consistent with the invention may be improved by using inductor current information (FIGS. 10 to 11) or AC current information (FIGS. 12 to 13). FIG. 10 illustrates another embodiment of a DC-DC converter 1000 consistent with the invention utilizing inductor current information for improved stability. In general, the feedback voltage value from the $V_{out}$ terminal 112 along a feedback path to the comparator 118 may be modified by a stability circuit 1022 to increase the stability of the DC to DC converter.

The stability circuit 1022 may include an operational amplifier 1026 along with resistors R1 and R2. A sense resistor 1030 may also be provided in series with the inductor L1. The voltage across the sense resistor 1030 is indicative of the current through the inductor L1. The current through inductor L1 is amplified by a factor set by the resistors R1 and R2 and equal to $A_{current}=1+R2/R1$. As such, the value of the feedback voltage $V_{PWM}$ fed to the inverting input terminal of the comparator 118 in the embodiment of FIG. 10 is given by equation (1).

$$V_{PWM\ comparator}=V_{out}+(1+R2/R1)*I_{inductor}*R_{cs}; \quad (1)$$

In equation (1), $V_{out}$ is the output voltage of the DC to DC converter, R1 and R2 are the respective value in ohms of the resistors R1 and R2, $I_{inductor}$ is the inductor current through inductor L1 and Rcs is the value in ohms of the sense resistor 1030. As such, stability is improved since the inductor current is only shifted by 90 degrees. In addition, the output voltage $V_{out}$ decreases with an increasing inductor current which is desirable to minimize the output voltage range during transients.

Turning to FIG. 11, the stability circuit 1103 may further include an RC circuit 1102 formed by resistor 1140 and capacitor 1142. As such, stability is further improved by adding a zero in the frequency range of the dual pole created by the inductor L1 and capacitor C1.

Stability may also be improved by using AC current information. For instance, turning to FIG. 12, the stability circuit 1203 may include an RC circuit 1226 to introduce a zero in the frequency range of the dual pole created by the inductor L1 and capacitor C1. The RC circuit 1226 may include resistors R1 and R2 coupled in parallel and capacitor Ccomp. The resistor divider formed by resistors R1 and R2 enables the output voltage to be scaled down to a desired value. The value of the capacitor Ccomp should be selected in such a way that the RC circuit 1226 introduces a zero in the frequency range of the dual pole created by the inductor L1 and capacitor C1. The relationship between the LC dual pole position and the RC time constant for the RC circuit 1226 was experimentally found and verified by simulation and is given by equation (2).

$$3RC=\sqrt{LC} \quad (2)$$

Turning to FIG. 13, an amplifier 1324 having an amplification factor N may be added to the stability circuit 1342. The input to the amplifier 1324 may be coupled to node 1346 while the output of the amplifier may be coupled to the capacitor Ccomp. As such, the output of the amplifier 1324 is connected to the feedback resistor divider formed by resistor R1 in parallel with resistor R2 through the capacitor Ccomp. The RC circuit 1326 includes capacitor Ccomp and resistors R1 and R2 in parallel. As such, by amplifying the AC current information the stability of the DC to DC converter 1300 may be further improved. However, there is a certain limitation on the size of the amplification factor N in order to maintain a clean, jitter free PWM pulse provided by the comparator 118. For instance, the feedback signal AC peak to peak amplitude should be smaller than the amplitude of ramp reference signal 126. As such, there is a limitation to the amplification factor N to meet this requirement. For example, if the voltage ripple at node 1346 is 10 mV peak to peak, and the amplitude of the ramp reference signal 126 is 100 mV, then the amplification factor N of the amplifier 1324 should be smaller than 10. The amplified ripple from the amplifier 1324 is passing the capacitor Ccomp and at the ripple frequency this ripple voltage will be seen almost with the same amplitude at the common node between resistors R1, R2, and Ccomp. In one embodiment, an amplification factor N of about 5 to 6 is appropriate.

Those skilled in the art will recognize that although the accuracy and stability improvements illustrated in FIGS. 9 though 13 illustrate a single phase DC to DC converter, such improvements are equally applicable to multi-phased DC to DC converters as well.

The embodiments that have been described herein, however, are but some of the several which utilize this invention and are set forth here by way of illustration but not of limitation. It is obvious that many other embodiments, which will be readily apparent to those skilled in the art, may be made without departing materially from the spirit and scope of the invention as defined in the appended claims.

What is claimed is:

1. A DC to DC converter comprising:
   a comparator configured to compare a first signal with a second signal, said first signal having a DC offset determined, at least in part, by a DC reference voltage source, said second signal is representative of an output voltage level of said DC to DC converter, said comparator further configured to provide a control signal to a driver based on a difference between said first signal and said second signal, said driver driving said output voltage of said DC to DC converter; and
   an accuracy circuit configured to provide a predetermined offset voltage value to one of said first signal and said second signal based on a difference between a DC voltage level of said DC reference voltage source and said output voltage of said DC to DC converter.

2. The DC to DC converter of claim 1, wherein said accuracy circuit is configured to provide said predetermined offset voltage value to said first signal.

3. The DC to DC converter of claim 2, wherein said predetermined offset voltage value is a positive voltage if said output voltage of said DC to DC converter is less than said DC voltage level of said DC reference voltage source.

4. The DC to DC converter of claim 2, wherein said predetermined offset voltage value is a negative voltage if said output voltage of said DC to DC converter is greater than said DC voltage level of said DC reference voltage source.

5. The DC to DC converter of claim 1, wherein said accuracy circuit is configured to provide said predetermined offset voltage value to said second signal.

6. The DC to DC converter of claim 5, wherein said predetermined offset voltage value is a negative voltage if said output voltage of said DC to DC converter is less than said DC voltage level of said DC reference voltage source.

7. The DC to DC converter of claim 5, wherein said predetermined offset voltage value is a positive voltage if said output voltage of said DC to DC converter is greater than said DC voltage level of said DC reference voltage source.

8. The DC to DC converter of claim 1, wherein said accuracy circuit comprises an error amplifier and an offset voltage source, said offset voltage source responsive to an output signal of said error amplifier to provide said predetermined offset voltage value.

9. A DC to DC converter comprising:
   a comparator configured to compare a first signal with a second signal, said first signal having a DC offset determined, at least in part, by a DC reference voltage source, said second signal representative of an output voltage level of said DC to DC converter, said comparator further configured to provide a control signal to a driver based on a difference between said first signal and said second signal, said driver driving at least one switch to control a level of said output voltage of said DC to DC converter;

an inductor coupled to said at least one switch; and a stability circuit configured to provide said second signal to said comparator based on a current level.

10. The DC to DC converter of claim 9, wherein said current level is an inductor current level through said inductor.

11. The DC to DC converter of claim 10, wherein said stability circuit comprises an operational amplifier and a resistor network configured to provide a predetermined amplification factor to said current level.

12. The DC to DC converter of claim 11, wherein said resistor network comprises a first resistor and a second resistor, and wherein said predetermined amplification factor is equal to (1+R2/R1), where R1 is a resistance value of said first resistor and R2 is a resistance value of said second resistor.

13. The DC to DC converter of claim 11, wherein an LC filter comprising said inductor is coupled to said at least one switch, and wherein said stability circuit further comprises an RC circuit coupled to one input terminal of said operational amplifier, said RC circuit configured to enhance stability of said DC to DC converter by adding a zero in a frequency range of a dual pole of said LC filter.

14. The DC to DC converter of claim 9, wherein said current level is an AC current level.

15. The DC to DC converter of claim 14, wherein an LC filter comprising said inductor is coupled to said at least one switch, and wherein said stability circuit further comprises an RC circuit configured to enhance stability of said DC to DC converter by adding a zero in a frequency range of a dual pole of said LC filter.

16. The DC to DC converter of claim 15, wherein said stability circuit further comprises an amplifier having an output coupled to said RC circuit for providing an amplification factor to said second signal.

* * * * *